United States Patent
Thyzel et al.

(10) Patent No.: US 9,059,556 B2
(45) Date of Patent: Jun. 16, 2015

(54) COOLING ARRANGEMENT FOR LASER-ACTIVE SOLID-STATE MATERIALS, LASER ARRANGEMENT AND METHOD FOR COOLING A LASER-ACTIVE SOLID-STATE MATERIAL

(71) Applicant: A.R.C. Laser GmbH, Nuremberg (DE)

(72) Inventors: Reinhardt Thyzel, Eckental (DE); Jörg Hurich, Nürnberg (DE)

(73) Assignee: A.R.C. Laser GMBH (DE)

( * ) Notice: Subject to any disclaimer, the term of this patent is extended or adjusted under 35 U.S.C. 154(b) by 0 days.

(21) Appl. No.: 14/106,218

(22) Filed: Dec. 13, 2013

(65) Prior Publication Data

US 2014/0169393 A1    Jun. 19, 2014

(30) Foreign Application Priority Data

Dec. 18, 2012 (DE) .......................... 10 2012 112 554

(51) Int. Cl.
 *H01S 3/04* (2006.01)
 *H01S 3/042* (2006.01)
 *H01S 3/0941* (2006.01)
 *H01S 3/06* (2006.01)

(52) U.S. Cl.
 CPC ............. *H01S 3/0407* (2013.01); *H01S 3/0941* (2013.01); *H01S 3/042* (2013.01); *H01S 3/0606* (2013.01)

(58) Field of Classification Search
 CPC ........... H01S 3/047; H01S 3/042; H01S 3/16; H01S 3/1643; H01S 3/025
 USPC ......................................... 372/35, 34, 41, 70
 See application file for complete search history.

(56) References Cited

U.S. PATENT DOCUMENTS

| 5,636,239 | A * | 6/1997 | Bruesselbach et al. | ......... 372/70 |
| 2013/0039378 | A1 * | 2/2013 | Zhu et al. | ......................... 372/75 |

* cited by examiner

*Primary Examiner* — Kinam Park
(74) *Attorney, Agent, or Firm* — Workman Nydegger

(57) ABSTRACT

Cooling arrangement for laser-active solid-state materials, laser arrangement and method for cooling a laser-active solid-state material. The invention relates in particular to a cooling arrangement for the active liquid cooling of a laser-active solid-state material. In order to achieve an advantageous cooling effect, it is proposed to use a nozzle unit which is formed and adapted in order to subject the laser-active solid-state material to a directed coolant jet.

19 Claims, 6 Drawing Sheets

COOLING ARRANGEMENT FOR LASER-ACTIVE SOLID-STATE MATERIALS, LASER ARRANGEMENT AND METHOD FOR COOLING A LASER-ACTIVE SOLID-STATE MATERIAL

CROSS-REFERENCE TO RELATED APPLICATIONS

The present invention claims priority to German Patent Application No. DE 102012112554.6 entitled "Cooling Arrangement for Laser-active Solid-state Materials, Laser Arrangement and Method for Cooling a Laser-Active Solid-State Material," filed Dec. 18, 2012, the entire content of which is incorporated herein by reference.

BACKGROUND OF THE INVENTION

1. The Field of the Invention

The invention relates to a cooling arrangement for the active cooling of a laser-active solid-state material, to a laser arrangement and to a method for the active cooling of a laser-active solid-state material.

2. Background and Relevant Art

In order to avoid excessively high temperatures in laser-active solid-state materials, for example YAG (yttrium-aluminum-garnet), during the laser operation, it is known to cool the laser-active materials by applying a coolant.

Corresponding devices and methods for cooling laser-active solid-state materials, in particular laser crystals and the like, are known for example from DE 27 51 825 A1, U.S. Pat. No. 5,608,748 and DE 35 22 443 A1.

DE 27 51 825 A1 describes a method in which the laser medium is arranged for cooling in a coolant bath and, by circulation of the coolant, is flowed over longitudinally thereby.

A similar method is known from U.S. Pat. No. 5,608,748.

DE 35 22 443 A1 discloses a method using combined gas/liquid cooling, wherein the direct cooling of the laser medium is carried out using a cooling gas.

In the known methods, unfavorable or insufficient cooling powers and cooling properties and gas bubbles in the (liquid) cooling medium may sometimes occur. In particular, in the known methods for liquid cooling of the laser media, the occurrence of gas bubbles in the cooling medium, particularly on the surfaces of the laser medium, cannot be fully avoided, so that impairments in the cooling or in the output stability of the laser can arise, particularly when the laser material is, for example, optically pumped through the liquid coolant.

BRIEF SUMMARY OF THE INVENTION

On the basis of this, it is an object of the invention to overcome the disadvantages according to the prior art. In particular, the intention is to provide a possibility with which improved cooling of laser-active solid-state materials can be achieved.

In particular, against this background, a cooling arrangement for the active cooling of a laser-active solid-state material, a laser arrangement and a method for the active cooling of a laser-active solid-state material are intended to be provided.

This object is achieved by a cooling arrangement as claimed in patent claim 1, a laser arrangement as claimed in patent claim 9 and a cooling method as claimed in patent claim 11. Configurations and refinements may be found in the respective dependent claims.

According to claim 1, a cooling arrangement for the active cooling of a laser-active solid-state material is provided. The cooling arrangement comprises a nozzle unit, which is formed and adapted to subject the laser-active solid-state material to a directed coolant jet of a liquid coolant (or cooling medium).

A laser arrangement as claimed in claim 9 comprises a laser-active solid-state material, in particular a YAG material, a pumping radiation source for optical pumping of the laser-active solid-state material, and a cooling arrangement according to the invention adapted or intended for cooling the laser-active solid-state material.

Claim 11 relates to a method for the active cooling of a laser-active solid-state material, wherein a surface, in particular a side surface, of the laser-active solid-state material is subjected to a directed coolant jet of a liquid coolant.

Particular and advantageous embodiments according to the invention will be described below, which may be used in the cooling arrangement, laser arrangement and the cooling method.

In a preferred embodiment, in particular by means of the nozzle unit, only a subsurface of the surface of the laser-active solid-state material is subjected to the coolant jet. The subsurface of the surface of the laser-active solid-state material, which is subjected to the coolant, preferably contains the pumping surface, subjected to pumping radiation or acting as an entry surface for the pumping radiation during the optical pumping, on the surface of the laser-active solid-state material.

Advantageously, a gas atmosphere, in particular air, is arranged between the nozzle unit or the nozzle(s) thereof and the laser-active solid-state material, in which atmosphere the directed coolant jet propagates as a free jet as far as the surface of the laser-active solid-state material.

In another advantageous embodiment according to the invention, the directed coolant jet propagates as a free jet in the gas atmosphere, in particular air, adjacent to the laser-active solid-state material as far as the surface of the laser-active solid-state material, then strikes the laser-active solid-state material in an incidence or impact zone and thereupon flows as a preferably laminar flow film (or surface flow) along the surface of the latter to be cooled, the flow direction or the flow profile of the flow film (or of the surface flow) being determined by the direction of the coolant jet relative to the surface and by the configuration of the surface flowed over. As seen transversely with respect to the flow direction, the width of the flow film or coolant jet is preferably selected to be at least as large as the transverse dimension of the subsurface, so that the coolant is the subsurface of the laser-active solid-state material in the entire width.

The coolant preferably leaves the surface of the laser-active solid-state material again in a shedding or lift-off zone, i.e. the coolant lifts off or the flow film (or the surface flow) is shed from the surface, and generally again propagates at least a short distance further as a free coolant jet.

By the use according to the invention of the directed coolant jet in the liquid cooling, particularly in comparison with a coolant bath or a flow of coolant, guided by means of walls, around the laser-active solid-state material, according to the prior art, the cooling power can be adjusted and adapted more precisely, in particular to the respective mode of operation. Besides this, it is been found that, when using a coolant jet, the formation of gas bubbles in the cooling medium, in particular on the cooled surface, can be reduced significantly, which leads to improvement of the cooling power and, in the case of optically pumping the laser-active solid-state material through the coolant, to reduced impairment of the pumping process. Overall, improved cooling can therefore be achieved.

This type of cooling according to the invention has proven particularly advantageous, in particular owing to the possibility of the formation of a laminar coolant film formed on the surface to be cooled, and in particular directed laterally downward.

In the term "coolant jet", the component word "jet" should be understood in particular in its original meaning, in particular in the sense of a flow not guided everywhere by walls. The use of a coolant jet therefore differs from the coolant baths known from the prior art, or the circulation of coolant in the coolant bath, since in these systems the coolant flows are always bounded everywhere by walls, in particular tube walls.

In a particularly advantageous embodiment, the coolant jet will be or is directed parallel or obliquely with respect to the subsurface of the surface of the laser-active solid-state material, preferably at an incidence angle in the range of from 0 degree to 10 degrees, in particular from 0.5 degree to 10 degrees. By oblique incidence of the coolant jet, in particular the formation of a laminar, in particular film-like, coolant flow extending over the subjected surface can be promoted. In the case of a corresponding laminar coolant flow, bubble formation in the coolant can be substantially, if not fully avoided, which can have an advantageous effect on the cooling and laser emission. The aforementioned angle ranges have proven advantageous particularly in the case of lateral, in regular use vertical, side surfaces. In the case of lateral side surfaces, a downwardly flowing laminar coolant flow, particularly in the form of a coolant film, can be achieved by applying the coolant jet in the region of an upper longitudinal edge of the side surface. In this way, a particularly large fraction of the respective side surface can be cooled.

In one configuration of the method, a flat jet, in particular a parallel flat jet, is used as the coolant jet. As already mentioned above, with a flat jet, in particular a parallel flat jet, it is possible to achieve a linear incidence zone, i.e. an incidence line, on the surface to be cooled. This is advantageous in particular for particularly uniform cooling of the laser-active material. Reference is additionally made to the comments above.

The nozzle unit generally has at least one nozzle, which preferably comprises a preferably tubular nozzle body and a nozzle opening preferably of the flat nozzle type. The width of the nozzle opening, which corresponds to the thickness of the coolant jet when emerging, is significantly less than the length of the nozzle opening, which corresponds to the width of the coolant jet when emerging, and preferably lies in a range of between 100 μm and 1000 μm.

A width of the coolant jet transversely with respect to its jet direction may be from a few millimeters up to 10 mm. At this point, it should be noted that the values mentioned, in particular the incidence angle, have proven particularly advantageous in respect of efficient cooling of the laser-active solid-state material, in particular a YAG-based, preferably an erbium:YAG-based laser material.

In the cooling arrangement and laser arrangement and the method according to the invention, the flow speed of the coolant in the coolant jet, in particular after emerging from the nozzle or nozzle unit, is generally at least 2 m/s, in particular between 2 m/s and 50 m/s, preferably between 5 m/s and 10 m/s and preferably between 8 m/s and 10 m/s.

Besides the aforementioned nozzle bodies and nozzle opening shapes, other respectively suitable shapes may also be used. The use of a flat nozzle has proven advantageous in the case of cuboid, in particular rod-like cuboid laser-active solid-state materials having rectangular surfaces, in particular side surfaces. The reason for this may, inter alia, be regarded as that a parallel flat jet can be generated with a flat nozzle geometry. A corresponding parallel flat jet has a linear incidence zone, i.e. an incidence line, on the corresponding surface, approximately constant cooling or cooling power being achievable along the incidence line. The parallel flat jet may advantageously be adjusted in such a way that the incidence line extends along an edge of the rectangular surface. In this way, it is possible for as large as possible a surface fraction of the respective surface to be subjected to cooling medium, i.e. cooled.

Particularly in the case of flat nozzles, the coolant jet may be adapted in width and thickness to the respective requirements. For example, the width of the flat nozzle, and therefore of the coolant jet, may be adapted to the width or extent of the surface to be cooled, while the flow quantity, and concomitantly inter alia the cooling power, may be adjusted by the thickness of the coolant jet. Besides a parallel flat jet, other jet geometries may also be used, in particular fan jets etc.

Overall, optimized cooling with simultaneously low impairment of the laser excitation and laser emission can be achieved according to the invention.

The laser-active solid-state material may, in particular, be a laser crystal material or a laser crystal. For example, without restriction of generality, the present invention is suitable for YAG (yttrium-aluminum-garnet)-based laser materials, particularly in erbium:YAG, Nd (Neodym):YAG or Ho (Holmium):YAG lasers, or alternatively for laser materials based on vanadate (yttrium-vanadium-oxide) or YSGG (yttrium-scandium-gallium-garnet).

The subsurface to be cooled, comprising the pumping surface, is preferably a lateral side surface extending parallel to the axial direction, forming the laser (emission) direction, of the laser-active solid-state material.

In an arrangement in which the laser material is optically pumped via lateral side surfaces, emission of the laser radiation taking place on axial end surfaces, the laser materials are preferably cooled on the side subjected to the pumping radiation. Coolants which are transmissive or transparent for corresponding pumping radiation sources, and which absorb or reflect the pumping radiation passing through as little as possible, are in this case preferably used. Precisely owing to the gas bubble formation reduced significantly with use according to the invention of a coolant jet, a pumping process taking place through the cooling medium, and therefore ultimately the laser emission, can be improved.

This configuration is suitable in particular for laterally optically pumped laser-active solid-state materials, such as Erbium:YAG, since in particular the respective side surface subjected to pumping radiation, and consequently heated more strongly, (and therefore in general the entire laser material) can be cooled optimally.

In particular water, preferably deionized water, or any other liquid coolant suitable for the formation of a coolant jet, may be used as the coolant.

With the aforementioned configuration, it is intended to be possible to subject at least one surface to the coolant jet. This, however, also includes variants in which more than one surface, in particular two surfaces, are subjected respectively to a coolant jet. For example, it is possible to direct corresponding coolant jets simultaneously, in a pulsed fashion or alternately onto two surfaces lying on mutually opposite sides of the laser-active solid-state material. The latter may, for example, be used in the case of laser-active materials pumped on two sides. In order to increase and/or optimize the cooling or cooling power, however, different or further surfaces may be subjected to a coolant jet.

According to another configuration, the cooling arrangement furthermore comprises a frame having a first holding segment and a second holding segment. The first holding segment is adapted for holding the laser-active solid-state material, which is preferably in a cuboid form. The second holding segment is adapted for holding, fixing and/or orienting the at least one nozzle of the nozzle unit. Preferably, the first and second holding segments are formed in one piece. It is, however, also possible for the two holding segments to be formed as individual parts connectable to one another.

A frame corresponding to the aforementioned configuration is particularly advantageous for accurate positioning and adjustment of the laser-active solid-state material and/or of the at least one nozzle. For the positioning, fixing and/or adjustment, the frame may in particular comprise holding, fixing or positioning means, in particular holding, fixing and/or positioning screws or screw holes etc. Furthermore, a frame constructed as in the present case from few elements or segments allows comparatively open positioning of the surface(s) to be cooled, which is advantageous or to some extent necessary for application of a directed jet of coolant. Positioning of the surface to be cooled which is too closed could sometimes, particularly in the case of high flow quantities, lead by backing up to the formation of a coolant bath, instead of the directed coolant jet proposed here and the laminar coolant film, which may prove disadvantageous for the reasons mentioned.

According to another configuration, the first holding segment comprises two side walls, or plates or side plates, which are parallel, mutually aligned and separated from one another. The side walls are formed and adapted for supporting the laser-active solid-state material, which may in particular have a rod-like cuboid shape, preferably in a stress-free manner, that is to say while avoiding tensile, compressive and/or bending stresses.

The use of side walls as holding segments for the laser-active solid-state material offers inter alia the advantage that a comparatively open space for positioning the laser-active solid-state material can be provided in the intermediate space between the side walls, this space being, as mentioned above, advantageous in the case of the use of a directional coolant jet proposed here. At the same time, in the normal direction, in which with suitable arrangement of the laser-active solid-state material laser radiation can be output, the side walls offer some manner of protection against the application of coolant, for example by splashing.

In a refinement, the frame comprises as a second holding segment an end wall extending transversely, in particular perpendicularly, with respect to the side walls. The end wall is formed and adapted for holding the at least one nozzle, preferably in such a way that the nozzle opening of a nozzle held by the second holding segment can be positioned in the volume, or space, between the side walls. The positioning between the side walls is preferably adjusted in such a way that a surface extending between the side walls, in particular a lateral or vertical side surface, of the laser-active solid-state material can be subjected to the directed coolant jet. A corresponding side surface may, for example, extend in the normal direction of the side walls.

When using an, in particular upper, end wall as a holding element for the at least one nozzle, particularly in the region where it is applied to the laser-active solid-state material, a structure, in particular of the frame, which is sufficiently open for the coolant jet can be achieved. Besides this, the arrangement of the nozzle(s) above the laser-active solid-state material offers the advantage that the corresponding surface can be subjected to the coolant jet obliquely from above, so that a downwardly directed, particularly effective, laminar coolant flow or coolant film can be formed.

According to another configuration, the side walls comprise two, in particular mutually aligned, openings. The openings are formed and respectively positioned on the side walls in such a way that a laser-active solid-state material, particularly of rod-like cuboid shape, adapted in cross section to the contour of the openings, can be mounted in them, the laser-active solid-state material engaging through the openings and being supported in the openings, preferably stress-free, on free axial ends facing away from one another. In this arrangement, the segment lying between the side walls of the laser-active solid-state material can, in particular, be subjected to pumping radiation and the coolant jet. At the same time, the axial end surfaces of the laser-active solid-state material, on which an end mirror and output mirror may be arranged, can be or are arranged on the side of the side walls facing away from the intermediate space and shielded, or protected, from the coolant by them. Thus, in general, direct impairment of the laser emission by coolant can be avoided.

A cross section of the laser-active solid-state material, adapted to the inner contour of the openings, is advantageous to the extent that defined positioning and orientation of the laser-active solid-state material can be achieved. This is also advantageous for the positioning and adjustment of the at least one nozzle.

According to another configuration, the cooling arrangement furthermore comprises two sealing elements, which are formed and adapted for, preferably coolant-tight, sealing respectively of a free axial end of a laser-active solid-state material engaging through the openings, at least along the inner contour of the respective opening. Thus, in particular, further to the aforementioned measures, perturbation-free laser emission can be achieved on the axial end surfaces.

Preferably, the sealing elements are connectable in a replaceably releasable way to the side walls, for example on sides of the side walls facing away from one another. With arrangement of the sealing elements outside the space formed between the side walls, the volume available between the side walls for excitation of the laser radiation can be maximized, the entire section between the side walls being usable for optical pumping of the laser-active material.

According to another configuration, each sealing element comprises a sealing means and a pressure plate. By the pressure plate, an associated sealing element in the mounted state can be subjected to a force acting in the direction of the respective side wall. In this way, particularly when using resilient sealing elements, besides a sealing effect it is also possible to achieve centering and fixing of the laser-active solid-state material. In particular, the latter permits comparatively straightforward mounting of the laser-active solid-state material. The sealing element can therefore to a certain extent be regarded as a fastening and fixing element for the laser-active solid-state material.

In a refinement, the openings have cross sections tapering in the axial direction, i.e. in the direction of the force resulting directly from the respective pressure plate. With this measure, it is possible for forces acting axially on the sealing elements to generate radially acting force components by which, besides an improved sealing effect, inter alia the clamping of the laser-active solid-state material in the openings can also be improved.

Overall, it is clear that particularly advantageous and effective cooling is made possible by the proposed cooling arrangement.

Preferably, by means of the coolant jet, the subsurface subjected to the coolant, in particular the pumping surface, can besides the cooling effect also be kept free or freed of deposits or contamination (cleaned), which improves the optical properties.

Additional features and advantages of exemplary implementations of the present invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

Exemplary embodiments of the invention will be described in more detail below with the aid of figures, in which.

Unless otherwise described, identical elements and quantities are denoted by the same references in the figures.

DETAILED DESCRIPTION OF THE PREFERRED EMBODIMENTS

Figure 1:
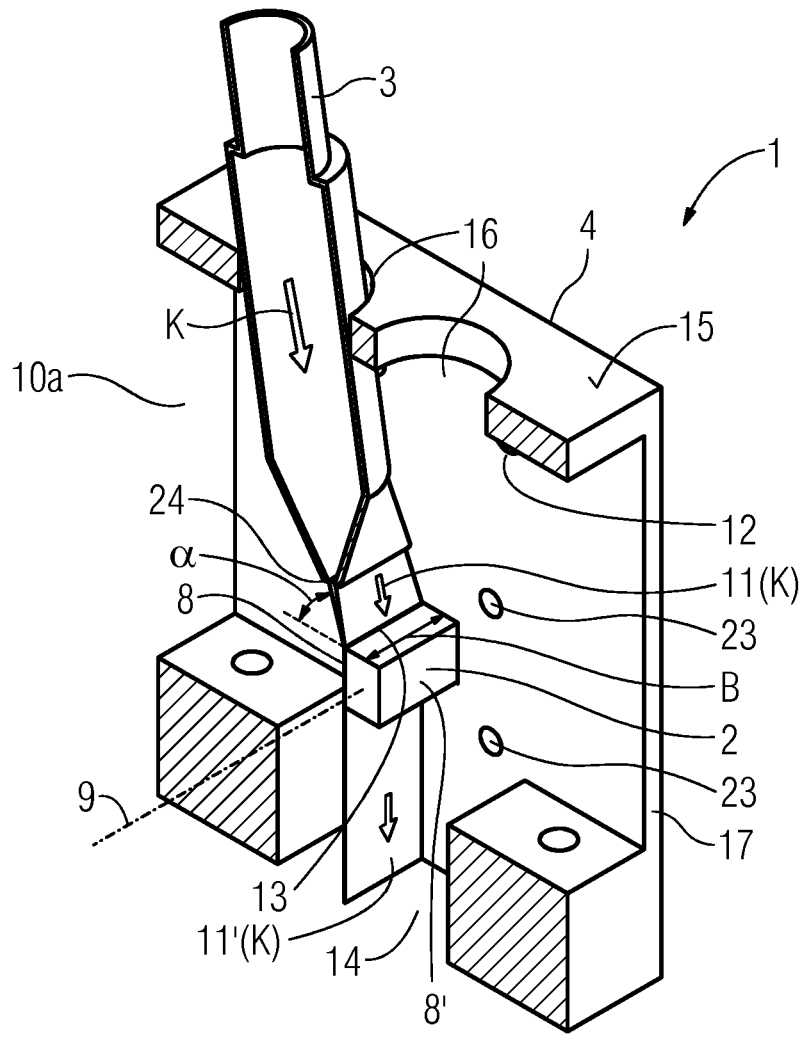
FIG. 1 shows a three-dimensional sectional representation of a cooling arrangement for the active liquid cooling of a laser crystal.

FIG. 1 shows a three-dimensional sectional representation of a cooling arrangement 1 for the active liquid cooling of a laser crystal 2, in particular of a YAG laser crystal, or generally of a laser-active solid-state material. The cooling arrangement 1 comprises a nozzle unit having a nozzle 3, and furthermore a frame 4.

The frame 4 is formed and adapted in order to hold the laser crystal 2, particularly in such a way that no additional stresses or strains are induced in the laser crystal 2 by the frame 4. To this extent, the frame 4 is formed in order to hold the laser crystal 2 in a stress-free manner. The frame 4 is furthermore formed in order to hold a nozzle unit for cooling the laser crystal 2.

The frame 4 is, as can be seen in particular from the figures, formed as a one-piece element or component, but it comprises, particularly when considered more functionally, a plurality of segments, in particular holding segments, which will be discussed in more detail below.

Figure 2:
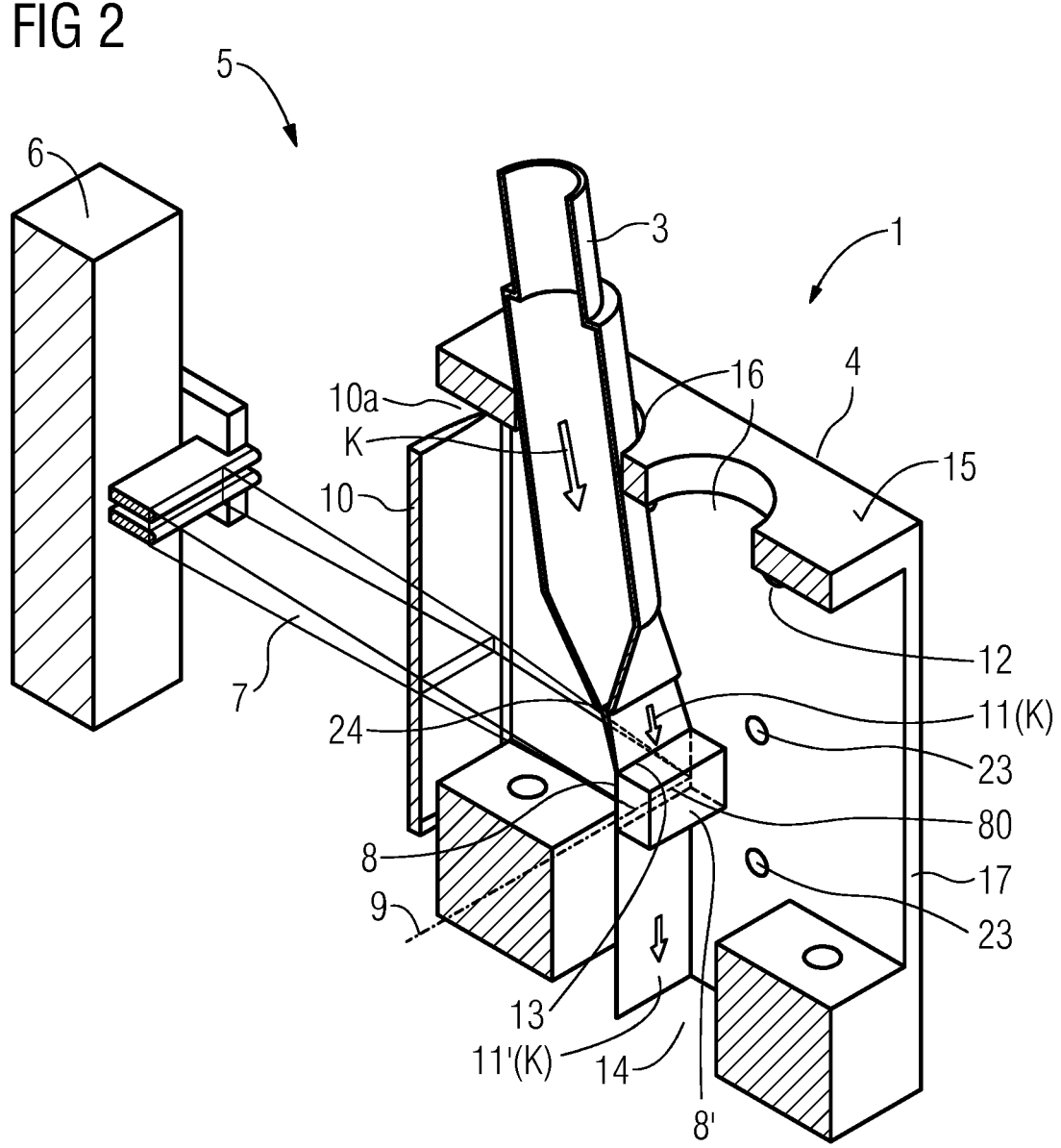
FIG. 2 shows a three-dimensional sectional representation, corresponding to FIG. 1, of a laser arrangement comprising the cooling arrangement.

The holding element 4 shown in FIG. 1, and the cooling arrangement 1, including the laser crystal 2, may be used in lasers, particularly in a laser arrangement 5 represented in the three-dimensional section in FIG. 2. Besides the elements already shown in FIG. 1, the laser arrangement 5 shown in FIG. 2 furthermore comprises a pumping radiation source, in particular a pumping light source 6. The pumping radiation source 6 is provided in order to optically pump the laser crystal 2 and thereby excite it to laser emission.

The laser crystal 2 has an axial direction (or laser emission direction) 9, which corresponds to the direction of the laser emission. On the end sides of the laser crystal 2 lying in the axial direction 9, there are respectively end and output mirrors (not shown). The laser crystal 2 is preferably formed in the shape of a cuboid or rod. Parallel (or axially or longitudinally) to the axial direction 9, a side surface 8 of the laser crystal 2, formed in a planar or flat fashion, and an opposite likewise planar side surface 8' of the laser crystal 2, each extend vertically in the exemplary embodiment represented. The axial length of the laser crystal 2 and its side walls 8 and 8' is denoted by B in FIG. 1.

Figure 4:
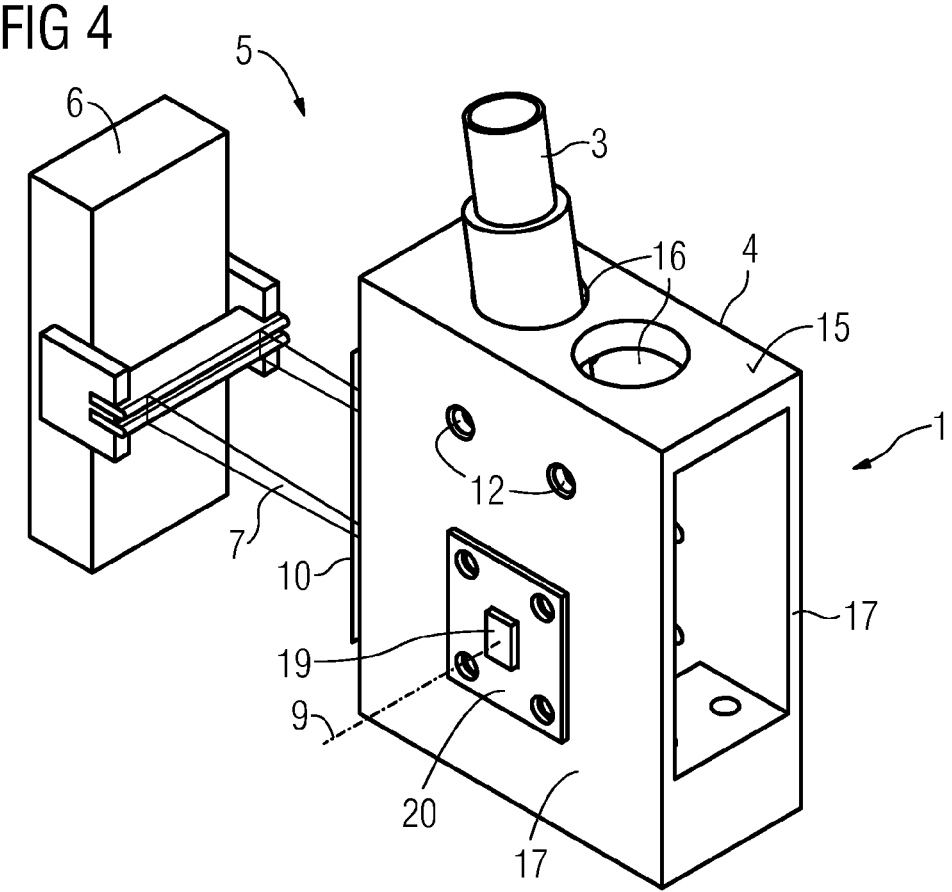
FIG. 4 shows a perspective view of the laser arrangement according to FIG. 2.
Figure 5:
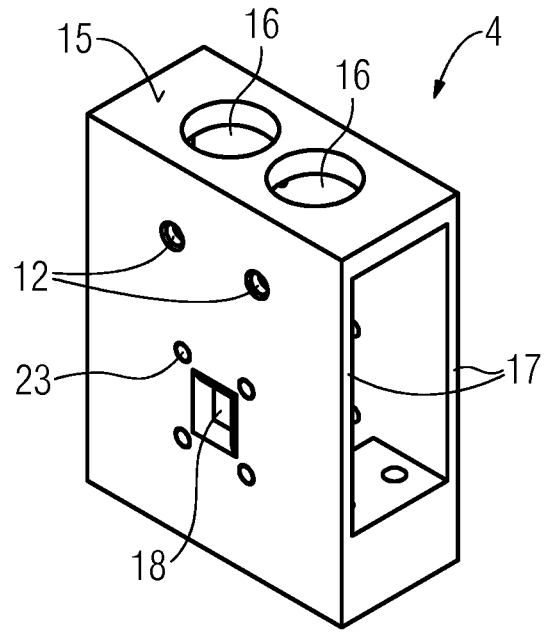
FIG. 5 shows a perspective representation of a frame of the cooling arrangement.
Figure 6:
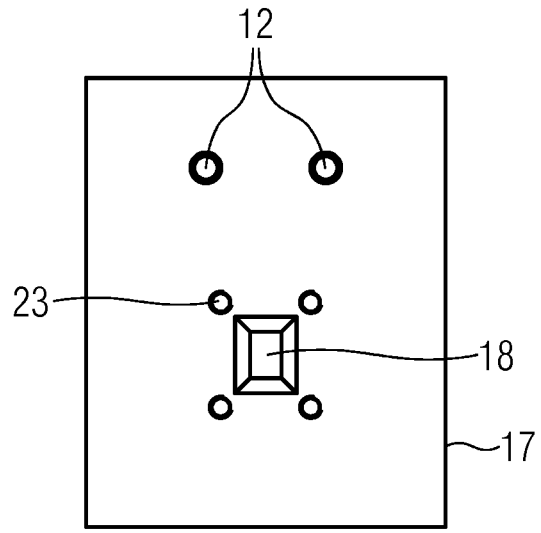
FIG. 6 shows a first side view of the frame.
Figure 7:
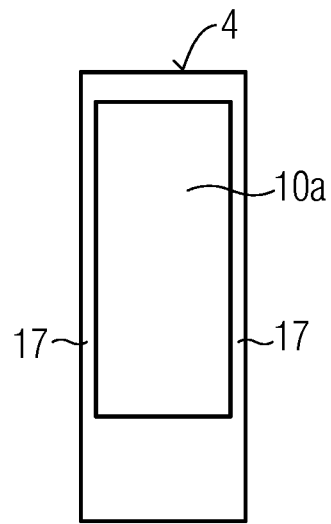
FIG. 7 shows a second side view of the frame.
Figure 8:
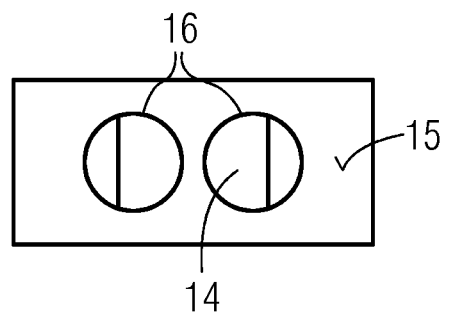
FIG. 8 shows a view of the frame from above.
Figure 9:
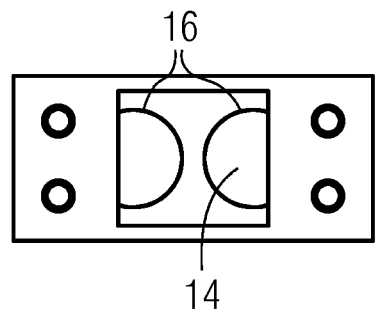
FIG. 9 shows a view of the frame from below.

In the case shown in FIG. 2, and moreover also in FIG. 4, the pumping radiation source 6 is arranged in such a way that pumping radiation 7 emerging therefrom is shone onto a small subsurface of the side surface 8 of the laser crystal 2, which is referred to as the pumping surface 80 (lateral pumping).

In respect of the term "lateral pumping", it should also be mentioned that, according to the usual operating position of the frame 4 and laser crystal 2 as shown in the figures, the pumping direction, i.e. the incidence direction of the pumping radiation 7, is perpendicular to the side surface 8 or the axial direction 9 of the laser crystal (lateral, transversal).

The term "lateral" or "side" relating to the incidence direction of the pumping radiation 7 is thus in particular to be understood as meaning that the laser crystal 2 is pumped transversely, in particular perpendicularly, with respect to the direction of the laser emission, i.e. with respect to the axial direction 9. The pumping radiation 7 per se is emitted in the horizontal direction in the representation of FIG. 2 and FIG. 4, and is, particularly in the example shown, focused through an entry window 10 (FIG. 2, FIG. 4), which may have focusing properties, onto the pumping surface 80 of the laser crystal 2.

It should be noted that the entry window 10 and any further elements of the pumping radiation source 6 which focus the pumping radiation 7 may also be arranged differently. The entry window 10 is arranged in the region of a side or lateral, in the present case horizontal, end side of the frame 4, and at least partially covers an entry opening 10a present on the end side owing to the open design of the frame.

In the exemplary embodiment shown in the figures, the frame 4 is formed symmetrically insofar as the laser crystal 2 can be pumped through both lateral side surfaces 8 and 8'. This means that the laser crystal 2 can be pumped from the left, as shown in FIG. 2, and, in the case of a corresponding arrangement of a further pumping radiation source, also from the right, in particular from both sides.

It should be noted that, while maintaining the cooling principle proposed herein for the laser crystal 2, arrangements other than those shown, in particular of the laser crystal 2 and pumping radiation source 7, are also possible.

By subjecting the laser crystal 2 to the pumping radiation 7, the laser crystal 2 is heated, in particular on the pumping surface 80 subjected to the pumping radiation 7 and the surrounding region of the side surface 8. Since in particular heating of the laser crystal 2 can be detrimental to the laser emission, it is necessary to cool the laser crystal 2, which in the exemplary embodiments shown is done by using the nozzle 3, or a nozzle arrangement, of the cooling arrangement 1.

As can be seen particularly in FIG. 1 and FIG. 2, a directed coolant jet 11 of liquid coolant K is generated by the nozzle 3.

The flow speed of the coolant in the coolant jet, in particular after emerging from the nozzle 3 or nozzle unit, is generally at least 2 m/s, in particular between 2 m/s and 50 m/s, preferably between 5 m/s and 10 m/s and preferably between 8 m/s and 10 m/s.

The nozzle 3 is formed and adapted in such a way that the coolant jet 11 strikes the pumped side surface 8 at a suitable incidence angle 90°−α, which in the exemplary embodiment represented corresponds to the angle with respect to the vertical or with respect to the plane of the side surface 8, α being the represented incidence angle with respect to the surface normal to the side surface 8, i.e. here the horizontal.

The incidence angle 90°−α with respect to the side surface 8 may, for the arrangements shown in the figures, lie particularly in the range of from 0.5 degree to 10 degrees, with the incidence angle α correspondingly lying between 80° and 89.5°. Such incidence angles have proven favorable with respect to the formation of a laminar coolant flow or a laminar flow film along the side surface 8, particularly when using water or deionized water as the coolant. An arrangement of the coolant jet 11 parallel to the side surface 8 with 90°−α=0° is possible in principle, but requires more accurate adjustment. When using other coolants, in particular having different properties, in particular different viscosity and/or adhesion, different incidence angles 90°−α than water may be necessary. To this end, for example, the nozzle 3 may be oriented and fixed in the frame 4 according to the respective requirements.

Figure 3:
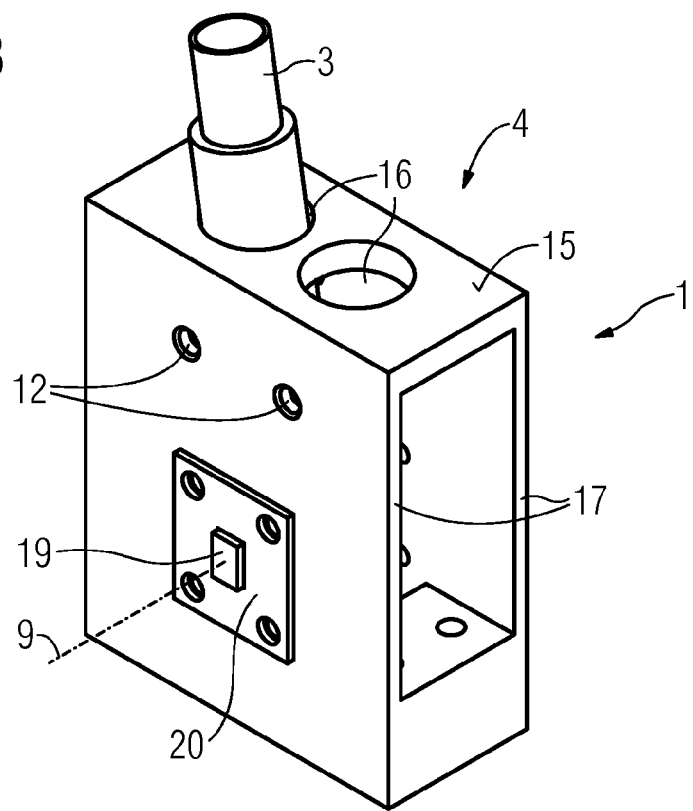
FIG. 3 shows a perspective view of the cooling arrangement according to FIG. 1.

In order to fix the nozzle 3, in particular according to the orientation required for the respective incidence angle 90°−α, the frame 4 may comprise adjusting, retaining and fixing elements. As can be seen in particular from FIG. 3 and FIG. 4, which show the entire cooling arrangement 1 corresponding to FIG. 1 and FIG. 2 in perspective view, the adjusting, retaining and fixing elements in the present example comprise screw holes 12, with the aid of which the nozzle 3 can be fastened and suitably fixed by means of adjusting and fixing screws (not shown).

As can be seen in FIG. 1 and FIG. 2, the coolant jet 11 emerging from the correspondingly oriented nozzle 3 strikes the pumped side surface 8 on an incidence surface in the vicinity of the upper longitudinal edge 13. As has been shown, in particular owing to the coolant jet 11 which is inclined with respect to the side surface 8 by the incidence angle α, in particular with a suitable flow speed of the coolant, a laminar coolant flow is set up downstream of the incidence point of the coolant jet 11 and along the surface of the side surface 8. It has furthermore been shown that the laminar coolant flow which is formed is essentially free of air bubbles or gas bubbles, so that not least for this reason a particularly advantageous cooling effect can be achieved.

After passing over the laser crystal 2, in particular the side surface 8 of the laser crystal 2, in the case of the frame 4 shown in the figures the coolant K can flow away over a lower end surface, that is to say through an outlet opening 14 present in the bottom of the frame 4.

The coolant which has flowed away may be collected again in a collection region (not represented in detail) and recycled to the cooling circuit, so that a closed coolant circuit is produced.

For suitable fastening and positioning of the laser crystal 2 and the nozzle 3, despite the exemplary one-piece design in the present case, the frame 4 has a first holding segment, which is formed for holding, positioning and fixing the laser crystal 2, and a second holding segment, which is formed for holding, positioning and fixing the nozzle 3. It should be noted that the frame 4 may also be formed in two or more pieces, subdivision into individual holding segments being possible in particular.

The frame 4 will be described in more detail below with reference to FIG. 1 to FIG. 4, as well as the further figures FIG. 5 to FIG. 9.

In order to fasten and position the nozzle 3, the frame 4 in the present case has two holding bores 16 on an upper end side 15. The nozzle can be inserted into these holding bores 16 and positioned in such a way relative to the laser crystal 2 and, by means of the screw holes 12, fixed in such a way that the laser crystal 2 is subjected to the coolant jet 11 in a suitably inclined way. For positioning, fixing and holding of the nozzle 3, other elements may also be used as an alternative or in addition.

The symmetrically arranged holding bores 16, two of which are provided in the present example, may for example each be fitted with a nozzle 3 in the case of lateral pumping of the laser crystal 2 on two sides. In the case of pumping of the laser crystal 2 on one side, corresponding to FIG. 1 and FIG. 2, the nozzle 3 may be arranged in the respectively suitable holding bore 16. In the case of a non-symmetrical configuration of the frame 4, the first holding segment may also have merely one holding bore 16 with one set of corresponding positioning and fixing elements provided.

In the present example, the first holding segment for holding, positioning and fixing the laser crystal 2 comprises two parallel side walls 17 separated from one another and arranged mutually aligned, each having an opening 18. The openings 18 present in the side walls 17 are arranged mutually aligned and adapted in cross section, or in contour, to the axial cross section of the respective laser crystal 2. In this way, the laser crystal 2 can be arranged in a manner engaging through the openings.

The laser crystal 2 and the frame 4 are dimensioned in such a way that the laser crystal 2 can be arranged in a manner engaging through the openings 17, particularly in such a way that the laser crystal 2 is mounted stress-free on free axial ends 19 facing away from one another. The laser crystal 2, or more precisely the free axial ends 19, extend through the openings 18 so that the regions of the end mirror and output mirror, i.e. respective end sides of the laser crystal 2, are exposed and cannot be influenced or impaired by the frame 4, and in particular the cooling arrangement 1.

As can be seen in particular from FIG. 1 to FIG. 4, the laser crystal 2 is subjected to the coolant in an inner volume of the frame 4. Already by this configuration, in particular by use of the side walls 17 formed essentially continuously, the axial ends of the laser crystal 2 are shielded from the cooling liquid in the region of the end mirror and/or output mirror. In order additionally to prevent cooling liquid from reaching the ends of the laser crystal 2 through the openings 18, and possibly impairing the emission of laser light, the openings 18 in the configuration shown are sealed with sealing elements.

Figure 10:
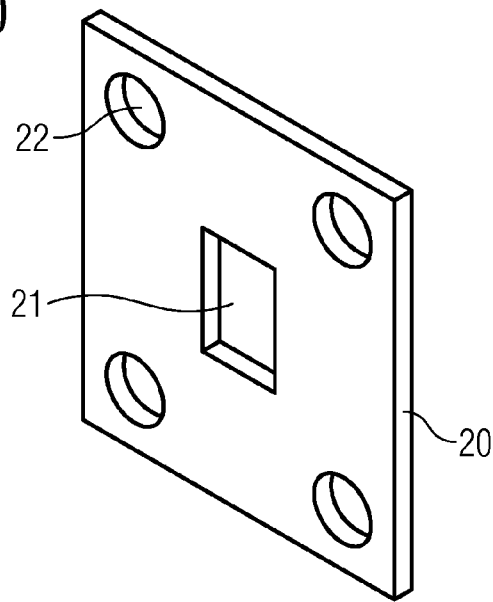
FIG. 10 shows a perspective view of a pressure plate of the frame.

Each of the openings 18 is sealed by a sealing element which comprises a sealing element (not shown) and a pressure plate 20. By way of example, a pressure plate 20 is shown in a perspective representation in FIG. 10. The pressure plate 20 comprises a recess 21 corresponding with the openings 18 of the side walls 17, and four fastening bores 22.

The recess 21 and fastening bores 22 are arranged in such a way that, when the pressure plate 20 is fastened on the outer surfaces of the side walls 17, they are aligned with the respective opening 18 and corresponding further fastening bores 23. By means of the fastening bores 22, 23, the pressure plate 20 can be fastened in particular releasably on a respective side wall 17. The recess 21 is, in particular, configured in such a way that the laser crystal 2 can engage through the pressure plate 20, so that the laser crystal 2 can be sealed circumferentially, which will be described in detail below.

For coolant-tight sealing of the openings 18, they have chamfered edges, so that they taper in axial cross section toward the interior of the frame 4. Owing to the chamfered edges, there is a wedge-shaped gap between the laser crystal 2 and the opening 18, or more precisely its edges. A sealing element can be placed in this wedge-shaped gap. With corresponding dimensioning of the sealing element, it is pressed into the wedge-shaped gap during fastening of the pressure plate 20 on the side wall 17, so that a sealing effect is obtained by press clamping of the sealing element. Besides the sealing effect, fixing of the laser crystal 2 in the openings 18 can furthermore be achieved by the press clamping. To this extent, the pressure plate 20 and the sealing element are also used as fastening elements for the laser crystal 2.

The openings 18 of the side walls 17 are and can be formed in such a way that the laser crystal 2 is positioned in the respectively required orientation. In particular, the openings 18 may be formed in such a way that the region of the laser crystal 2 lying between the side walls 17 is positioned and oriented according to the respective requirements.

In the present case, the orientation of the laser crystal 2 is dictated in a fixed way by the openings 18. It would be conceivable to provide the openings 18 and corresponding fastening and/or clamping elements which permit flexible orientation of the laser crystal 2, for example by the laser crystal 2 being fixable in different positions, rotated with respect to the axial direction.

The possibility of flexible orientation of the laser crystal 2 is, however, of less relevance when there are sufficient possibilities for orientation and positioning of the nozzle 3 and therefore of the coolant jet 11.

In particular owing to the holding bores 16 and screw holes 12, the position and orientation of the nozzle 3 in the present exemplary embodiments can be adjusted to a sufficient extent with corresponding screw fastenings. In particular, the nozzle 3 can be arranged and positioned in such a way that a nozzle opening 24 of the nozzle 3 is positioned between, more precisely in the volume between, the side walls 17, and the lateral side surface 8 of the laser crystal 2 can be subjected to the coolant jet 11 at the respectively suitable incidence angle α.

Figure 11:
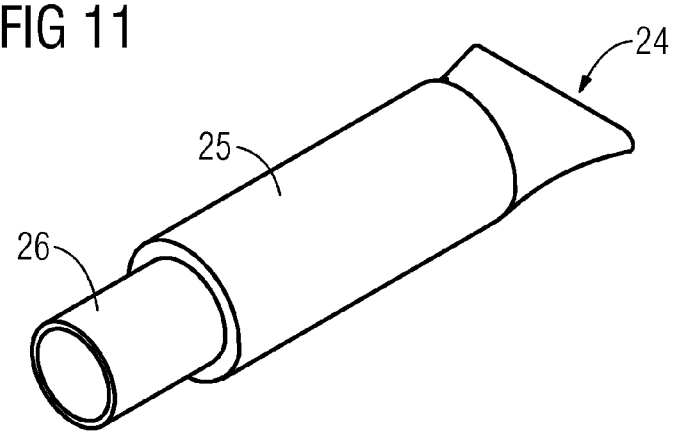
FIG. 11 shows a perspective view of a nozzle of the cooling arrangement.
Figure 12:
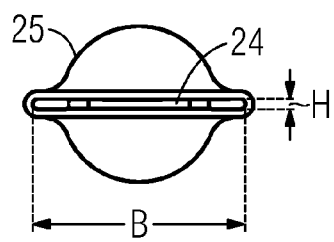
FIG. 12 shows a first axial plan view of the nozzle.
Figure 13:
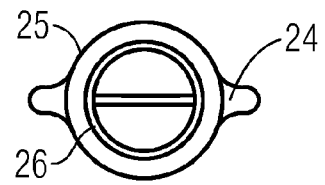
FIG. 13 shows a second axial plan view of the nozzle.

The nozzle 3 per se will now be described in more detail with reference to FIG. 11 to FIG. 13. FIG. 11 shows the nozzle 3 in a perspective representation, while FIG. 12 and FIG. 13 show the nozzle 3 in axial views.

The nozzle 3 comprises a tubular nozzle body 25, at one end of which there is the nozzle opening 24, in the present case formed tapering in the manner of a flat nozzle, and at the other end of which there is a tapered coupling section 26. By means of the coupling section 26, the nozzle 3 can be connected to a coolant line.

In the present case, the nozzle opening 24 is formed to be flat and wide in such a way that the laser crystal 2 can be subjected to the coolant jet 11 in an incidence zone extending in a straight line. A straight incidence zone has proven particularly advantageous for the formation of a laminar coolant flow. The breadth and opening width of the nozzle opening 24 are also formed in the present case in such a way that the nozzle 3 can readily be arranged between the side walls 17, and that the laser crystal 2 can be subjected to the coolant jet 11 essentially over the entire length between the side walls 17. The latter means, in particular, that the incidence zone extends over the axial length of the laser crystal 2 lying between the side walls 17. The length of the laser crystal 2 between the side walls 17 This is particularly advantageous for effective cooling of the laser crystal 2.

Overall, a particularly effective method for cooling the laser crystal 2 can be carried out with the proposed cooling arrangement 1, in that, as described in detail, the side surface 8 of the laser crystal 2 is subjected to the directed coolant jet 11 with parallel or oblique incidence, a flat jet, preferably a parallel flat jet, being usable in particular as the coolant jet 11. With corresponding application to the laser crystal 2, or its side surface 8, it is possible to achieve a laminar coolant flow along the side surface 8, which permits particularly effective, in particular bubble-free, cooling of the laser crystal 2.

LIST OF REFERENCES 1 cooling arrangement
2 laser crystal
3 nozzle
4 frame
5 laser arrangement
6 pumping radiation source
7 pumping radiation
8 side surface
9 axial direction
10 entry window
10a entry opening
11, 11' coolant jet
12 screw hole
13 upper longitudinal edge
14 outflow opening
15 upper end side
16 holding bore
17 side wall
18 opening
19 free axial end
20 pressure plate
21 recess
22 fastening bore
23 further fastening bore
24 nozzle opening
25 nozzle body
26 coupling section
80 pumping surface
α incidence angle
B width
H height
K coolant

We claim:

1. A cooling arrangement for the active cooling of a laser-active solid-state material, comprising:
   a nozzle unit formed and adapted to subject the laser-active solid-state material to a directed coolant jet of a liquid coolant (K), wherein:
   the nozzle unit is formed and adapted in such a way that only a subsurface of a surface of the laser-active solid-state material is subjected to the coolant jet, the subsurface containing a pumping surface subjected to pumping radiation during the optical pumping on the surface of the laser-active solid-state material.

2. The cooling arrangement as claimed in claim 1, wherein:
the subsurface is a lateral side surface extending parallel to an axial direction, forming the laser emission direction, of the laser-active solid-state material.

3. The cooling arrangement as claimed in claim 1, wherein:
the nozzle unit is formed and adapted, and arranged relative to the subsurface of the surface of the laser-active solid-state material, in such a way that a flow film of the coolant (K) is formed on the subsurface;
the width of the flow film or coolant jet, as seen transversely to the flow direction, is preferably at least as large as the transverse dimension of the subsurface flowed over.

4. The cooling arrangement as claimed in claim 1, wherein, between the nozzle unit and the laser-active solid-state material there is a gas atmosphere, in particular air, in which the directed coolant jet propagates as a free jet as far as the surface of the laser-active solid-state material.

5. The cooling arrangement as claimed in claim 1, wherein the nozzle unit is:
formed and adapted in such a way that the coolant jet arrives; and/or
directed parallel or obliquely with respect to the subsurface of the surface of the laser-active solid-state material, preferably at an incidence angle (α) relative to the surface normal of the subsurface in the range of from 80 degrees to 90 degrees, in particular from 80 degrees to 89.5 degrees.

6. The cooling arrangement as claimed in claim 1, wherein:
the nozzle unit has at least one nozzle which preferably comprises a preferably tubular nozzle body and a nozzle opening preferably of the flat nozzle type; and
the width (H) of the nozzle opening, which corresponds to the thickness of the coolant jet when emerging, is significantly less than the length (B) of the nozzle opening, which corresponds to the width of the coolant jet when emerging, the width (H) of the nozzle opening preferably lying in a range of between 100 μm and 1000 μm.

7. The cooling arrangement as claimed in claim 6, further comprising:
a frame having a first holding segment for holding the laser-active solid-state material, which is preferably in a cuboid form, and a second holding segment for holding, fixing and orienting the at least one nozzle of the nozzle unit, wherein the frame is preferably formed in one piece;
wherein the first holding segment preferably comprises two side walls which are parallel, mutually aligned and separated from one another, for preferably stress-free mounting of the laser-active solid-state material, particularly of rod-like cuboid shape; and/or
wherein the frame comprises as a second holding segment an end wall extending transversely, in particular perpendicularly, with respect to the side walls, for holding the at least one nozzle, preferably in such a way that a nozzle opening of a nozzle held by the second holding segment can be positioned between the side walls, particularly in such a way that a surface extending between the side walls, in particular a lateral side surface, of the laser-active solid-state material can be subjected to the directed coolant jet.

8. The cooling arrangement as claimed in claim 7, wherein:
the side walls comprise two, in particular mutually aligned, openings into which a laser-active solid-state material, particularly of rod-like cuboid shape, adapted in cross section to the contour of the openings, can be mounted while engaging through the openings on free axial ends facing away from one another; and/or
the cooling arrangement furthermore comprises two sealing elements, in particular connectable in a replaceably releasable way to the side walls, preferably on sides of the side walls facing away from one another, which sealing elements are formed for, in particular coolant-tight, sealing respectively of a free axial end of a laser-active solid-state material engaging through the openings, at least along the inner contour of the respective opening;
each sealing element preferably comprises a sealing means and a pressure plate, by which a respective sealing element in the mounted state can be subjected to a force acting in the direction of the respective side wall; and/or
the openings preferably have cross sections tapering in the direction of the force resulting directly from the respective pressure plate.

9. A laser arrangement comprising a laser-active solid-state material, in particular a YAG material, a pumping radiation source for optical pumping of the laser-active solid-state material, and a cooling arrangement as claimed in claim 1, adapted for cooling the laser-active solid-state material.

10. The laser arrangement as claimed in claim 9, wherein:
on a surface, in particular side surface of the laser-active solid-state material, the coolant jet of the cooling arrangement subjects only a subsurface of the surface of the laser-active solid-state material to the coolant jet;
the subsurface of the surface of the laser-active solid-state material, which is subjected to the coolant (K) or to the coolant jet, preferably contains the pumping surface subjected to pumping radiation of the pumping radiation source during the optical pumping on the surface of the laser-active solid-state material; and/or
the pumping radiation preferably travels or passes through the coolant (K) at or on this pumping surface.

11. A method for the active cooling of a laser-active solid-state material, comprising:
subjecting a surface, in particular a lateral side surface, of the laser-active solid-state material to a coolant jet directed, in particular, obliquely with respect to the surface, wherein:
only a subsurface of the surface of the laser-active solid-state material is subjected to the coolant jet, the subsurface containing a pumping surface subjected to pumping radiation during the optical pumping on the surface of the laser-active solid-state material.

12. The method as claimed in claim 11, wherein:
the directed coolant jet propagates as a free jet in the gas atmosphere, in particular air, adjacent to the laser-active solid-state material as far as the surface of the laser-active solid-state material and then strikes the laser-active solid-state material in an incidence or impact zone, whereupon it flows as a flow film or surface flow along the surface of the latter to be cooled;
in particular the flow direction or the flow profile of the flow film or of the surface flow is determined by the direction of the coolant jet before incidence relative to the surface and by the configuration of the surface flowed over; and/or
wherein in particular the coolant leaves the surface of the laser-active solid-state material again in a shedding or lift-off zone and generally again propagates at least a short distance further as a free coolant jet.

13. The method as claimed in claim 11, wherein:
the coolant jet arrives and/or is directed parallel or obliquely with respect to the subsurface of the surface of the laser-active solid-state material, preferably at an incidence angle (α) relative to the surface normal of the subsurface in the range of from 80 degrees to 90 degrees, in particular from 80 degrees to 89.5 degrees; and/or a flat jet, in particular a parallel flat jet, is used as the coolant jet.

14. The method as claimed in claim 11, wherein by means of the coolant jet, the subsurface flowed over by the coolant, in particular the pumping surface, is kept free or freed of deposits or contamination.

15. The method as claimed in claim 11, wherein the flow speed of the coolant in the coolant jet, in particular after emerging from the nozzle or nozzle unit, is generally at least 2 m/s, in particular between 2 m/s and 50 m/s, preferably between 5 m/s and 10 m/s and preferably between 8 m/s and 10 m/s.

16. A cooling arrangement for the active cooling of a laser-active solid-state material, comprising:
   a nozzle unit formed and adapted to subject the laser-active solid-state material to a directed coolant jet of a liquid coolant (K), wherein the nozzle unit is formed and adapted in such a way that the coolant jet arrives at an incidence angle ( ) relative to the surface normal of a subsurface of the surface of the laser-active solid-state material in the range of from 80 degrees to 89.5 degrees.

17. The cooling arrangement as claimed in claim 16, wherein:
   the nozzle unit is formed and adapted, and arranged relative to the subsurface of the surface of the laser-active solid-state material, in such a way that a flow film of the coolant (K) is formed on the subsurface;
   the width of the flow film or coolant jet, as seen transversely to the flow direction, is preferably at least as large as the transverse dimension of the subsurface flowed over.

18. The cooling arrangement as claimed in claim 16, wherein:
   the nozzle unit has at least one nozzle which preferably comprises a preferably tubular nozzle body and a nozzle opening preferably of the flat nozzle type; and
   the width (H) of the nozzle opening, which corresponds to the thickness of the coolant jet when emerging, is significantly less than the length (B) of the nozzle opening, which corresponds to the width of the coolant jet when emerging, the width (H) of the nozzle opening preferably lying in a range of between 100 μm and 1000 μm.

19. The cooling arrangement as claimed in claim 16, further comprising:
   a frame having a first holding segment for holding the laser-active solid-state material, which is preferably in a cuboid form, and a second holding segment for holding, fixing and orienting the at least one nozzle of the nozzle unit, wherein the frame is preferably formed in one piece;
   wherein the first holding segment preferably comprises two side walls which are parallel, mutually aligned and separated from one another, for preferably stress-free mounting of the laser-active solid-state material, particularly of rod-like cuboid shape; and/or
   wherein the frame comprises as a second holding segment an end wall extending transversely, in particular perpendicularly, with respect to the side walls, for holding the at least one nozzle, preferably in such a way that a nozzle opening of a nozzle held by the second holding segment can be positioned between the side walls, particularly in such a way that a surface extending between the side walls, in particular a lateral side surface, of the laser-active solid-state material can be subjected to the directed coolant jet;
   wherein preferably:
   the side walls comprise two, in particular mutually aligned, openings into which a laser-active solid-state material, particularly of rod-like cuboid shape, adapted in cross section to the contour of the openings, can be mounted while engaging through the openings on free axial ends facing away from one another; and/or
   the cooling arrangement furthermore comprises two sealing elements, in particular connectable in a replaceably releasable way to the side walls, preferably on sides of the side walls facing away from one another, which sealing elements are formed for, in particular coolant-tight, sealing respectively of a free axial end of a laser-active solid-state material engaging through the openings, at least along the inner contour of the respective opening;
   each sealing element preferably comprises a sealing means and a pressure plate, by which a respective sealing element in the mounted state can be subjected to a force acting in the direction of the respective side wall; and/or
   the openings preferably have cross sections tapering in the direction of the force resulting directly from the respective pressure plate.

* * * * *

UNITED STATES PATENT AND TRADEMARK OFFICE
CERTIFICATE OF CORRECTION

PATENT NO.       : 9,059,556 B2
APPLICATION NO.  : 14/106218
DATED            : June 16, 2015
INVENTOR(S)      : Thyzel et al.

It is certified that error appears in the above-identified patent and that said Letters Patent is hereby corrected as shown below:

In the Specification

Column 3
Line 46, change "width" to --height (H)--
Line 49, change "length" to --length (B)--

Column 4
Line 30, change "(Neodym)" to --(Neodymium)--

Column 8
Line 4, change "holding element 4" to --frame 4--
Line 10, change "light source 6" to --radiation source 6--

Column 10
Line 46, change "openings 17" to --openings 18--

Column 12
Line 53, change "B width" to --B nozzle length (for coolant width)--
Line 54, change "H height" to --H nozzle height (for coolant thickness)--

Column 13
Line 34, 38, change "width (H)" to --height (H)--

In the Claims

Column 15
Line 24, change "angle ( )" to --angle (α)--
Line 42, 46, change "width (H)" to --height (H)--

Signed and Sealed this
Twenty-third Day of August, 2016

Michelle K. Lee
*Director of the United States Patent and Trademark Office*